US011091163B2

(12) United States Patent
Mori et al.

(10) Patent No.: US 11,091,163 B2
(45) Date of Patent: Aug. 17, 2021

(54) ROAD SURFACE CONDITION ASSESSING DEVICE

(71) Applicant: DENSO CORPORATION, Kariya (JP)

(72) Inventors: Masashi Mori, Kariya (JP); Nobuya Watabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/841,488

(22) Filed: Apr. 6, 2020

(65) Prior Publication Data

US 2020/0231162 A1 Jul. 23, 2020

Related U.S. Application Data

(63) Continuation of application No. PCT/JP2018/041545, filed on Nov. 8, 2018.

(30) Foreign Application Priority Data

Nov. 10, 2017 (JP) .............................. JP2017-217113
Jun. 22, 2018 (JP) .............................. JP2018-118775

(51) Int. Cl.
*B60W 40/00* (2006.01)
*B60W 40/06* (2012.01)
*B60W 50/029* (2012.01)
*B60W 50/04* (2006.01)

(52) U.S. Cl.
CPC .......... *B60W 40/06* (2013.01); *B60W 50/029* (2013.01); *B60W 50/04* (2013.01); *B60W 2422/70* (2013.01); *B60W 2552/35* (2020.02)

(58) Field of Classification Search
CPC ............ C12Q 1/6886; C12Q 2600/158; C12Q 2600/106; A61K 31/337; A61K 39/39558; A61K 2039/505; A61P 35/00; G01N 33/57415; G01N 33/6866; G01N 33/6872; G01N 33/743; G01N 2333/70532; G01N 2333/723; G01N 2800/7033; G01N 2333/57; G01N 33/74
See application file for complete search history.

(56) References Cited

U.S. PATENT DOCUMENTS

| | | | |
|---|---|---|---|
| 2008/0157950 A1 | 7/2008 | Mori et al. | |
| 2017/0136834 A1 | 5/2017 | Chong et al. | |
| 2018/0264894 A1* | 9/2018 | Goto ....................... B60T 8/172 |
| 2019/0047556 A1 | 2/2019 | Mori et al. | |

FOREIGN PATENT DOCUMENTS

| JP | 2008162534 A | 7/2008 |
|---|---|---|
| JP | 2010234858 A | 10/2010 |
| JP | 2016107833 A | 6/2016 |
| JP | 2017520451 A | 7/2017 |
| JP | 2017144975 A | 8/2017 |

* cited by examiner

*Primary Examiner* — Ian Jen
(74) *Attorney, Agent, or Firm* — Harness, Dickey & Pierce, P.L.C.

(57) ABSTRACT

A road surface condition assessing device includes a tire-side device disposed in a tire and a vehicle-body-side system disposed on a vehicle body side. The tire-side device generates a detection signal corresponding to a magnitude of vibration of the tire, produces road surface data based on the detection signal, and performs data communication with the vehicle-body-side system. The vehicle-body-side system performs the data communication with the tire-side device and assesses a road surface condition based on the road surface data received from the tire-side device.

8 Claims, 8 Drawing Sheets

ROAD SURFACE CONDITION ASSESSING DEVICE

CROSS REFERENCE TO RELATED APPLICATIONS

The present application is a continuation application of International Patent Application No. PCT/JP2018/041545 filed on Nov. 8, 2018, which designated the U.S. and claims the benefit of priority from Japanese Patent Applications No. 2017-217113 filed on Nov. 10, 2017 and No. 2018-118775 filed on Jun. 22, 2018. The entire disclosures of all of the above applications are incorporated herein by reference.

TECHNICAL FIELD

The present disclosure relates to a road surface condition assessing device which detects vibration received by a tire in a tire-side device, produces road surface data representing a road surface condition based on vibration data, transmits the road surface data to a vehicle-body-side system, and assesses the road surface condition based on the road surface data.

BACKGROUND

There has been proposed a road surface condition assessing method which detects vibration applied to a tire using an acceleration sensor provided in a back surface of a tire tread and also assesses a road surface condition based on a result of the detection of the vibration.

SUMMARY

The present disclosure describes a road surface condition assessing device that includes a tire-side device disposed in a tire and a vehicle-body-side system disposed on a vehicle body. The tire-side device generates a detection signal corresponding to a magnitude of vibration of the tire, produces road surface data based on the detection signal, and performs data communication with the vehicle-body-side system. The vehicle-body-side system performs the data communication with the tire-side device and assesses a road surface condition based on the road surface data received from the tire-side device.

DETAILED DESCRIPTION

Figure 1:
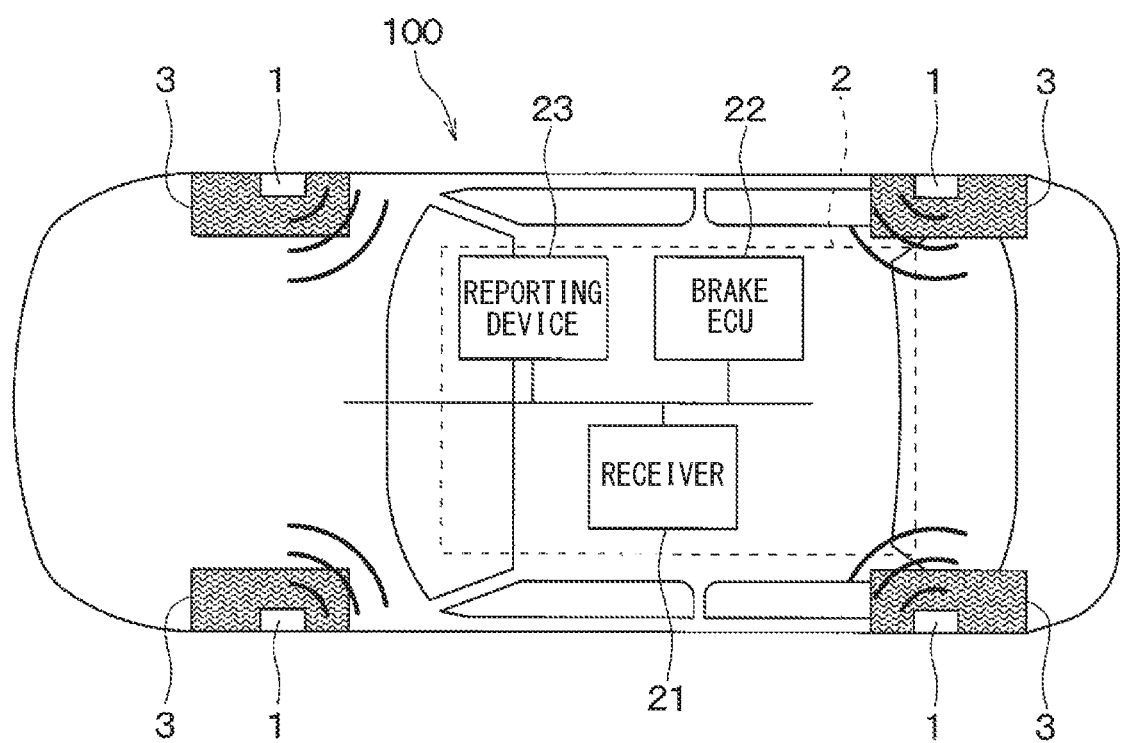
FIG. 1 is a diagram illustrating a block configuration of a tire apparatus, to which a tire-side device according to a first embodiment is applied, in a state where the tire apparatus is mounted in a vehicle.

For example, a road surface condition assessing device detects vibration applied to a tire using an acceleration sensor provided in a back surface of a tire tread and also assesses a road surface condition based on a result of the detection of the vibration. Such a road surface condition assessing device extracts feature vectors from a waveform of the vibration applied to the tire and detected by the acceleration sensor and calculates respective degrees of similarity of the extracted feature vectors to all support vectors stored for each type of the road surface to assess the road surface condition. For example, the road surface condition assessing device may calculate the degrees of similarity of the extracted feature vectors to all the support vectors using a kernel function, and assess that the type of the road surface having the highest degree of similarity, e.g., a dry road surface, a wet road surface, a frozen road, a snow-covered road, or the like corresponds to a currently traveled road surface condition. Such a road surface condition assessing may allow highly robust road surface assessment to be performed.

When a road surface condition is assessed by the method as described above, it is required to transmit data for the assessment of the road surface condition from a tire-side device to a vehicle-body-side system, but the data transmission consumes high power. However, if the tire-side device is provided at a position physically distant from the vehicle-body-side system, it is required to reduce power consumed in a power source unit. Particularly when a battery is used as the power source unit, replacement of the battery is not easy, and accordingly a further reduction in power consumption is required.

According to an aspect of the present disclosure, a road surface condition assessing device includes a tire-side device disposed in a tire and a vehicle-body-side system disposed on a vehicle body side. The tire-side device includes a vibration detector which outputs a detection signal corresponding to a magnitude of vibration of the tire, a first controller which produces road surface data based on the detection signal, and a first transmission/reception unit which performs data communication with the vehicle-body-side system. The vehicle-body-side system is configured to include a second transmission/reception unit which performs the data communication with the tire-side device and a second controller which assesses a road surface condition based on the road surface data received by the second transmission/reception unit, determines an ON/OFF state of an activation switch which brings a vehicle into a startable state, establishes connection of a communication between the first transmission/reception unit and the second transmission/reception unit when the activation switch is switched from an OFF state to an ON state, and causes the second transmission/reception unit to transmit a disconnection request signal requesting the tire-side device to cut off the connection when the activation switch is switched from the ON state to the OFF state.

Thus, the vehicle-body-side system is configured to transmit the disconnection request signal to the tire-side device when the activation switch is switched to the OFF state. The tire-side device, which is provided in the tire, cannot recognize the ON/OFF state of the activation switch. However, by transmitting the disconnection request signal from the vehicle-body-side system to the tire-side device, even the tire-side device is allowed to recognize that the activation switch is turned OFF. Consequently, it is possible to restrict the tire-side device from trying to maintain the connection even after the activation switch is switched to the OFF state and allow the tire-side device to cut off the connection. Therefore, it is possible to provide the road surface condition assessing device that can reduce power consumed by the tire-side device.

Embodiments of the present disclosure will be described hereinafter with reference to the drawings. Note that, in the following description of the individual embodiments, like or equivalent component parts are given like reference characters or numerals.

First Embodiment

Referring to FIGS. 1 to 8, a description will be given of a tire apparatus 100 having a road surface condition assessing function according to the first embodiment. The tire apparatus 100 according to the first embodiment assesses a road surface condition during driving based on vibration applied to a ground contact surface of a tire provided in each of wheels of a vehicle, and also performs warning of danger to the vehicle, vehicle movement control, and the like based on the road surface condition.

Figure 2:
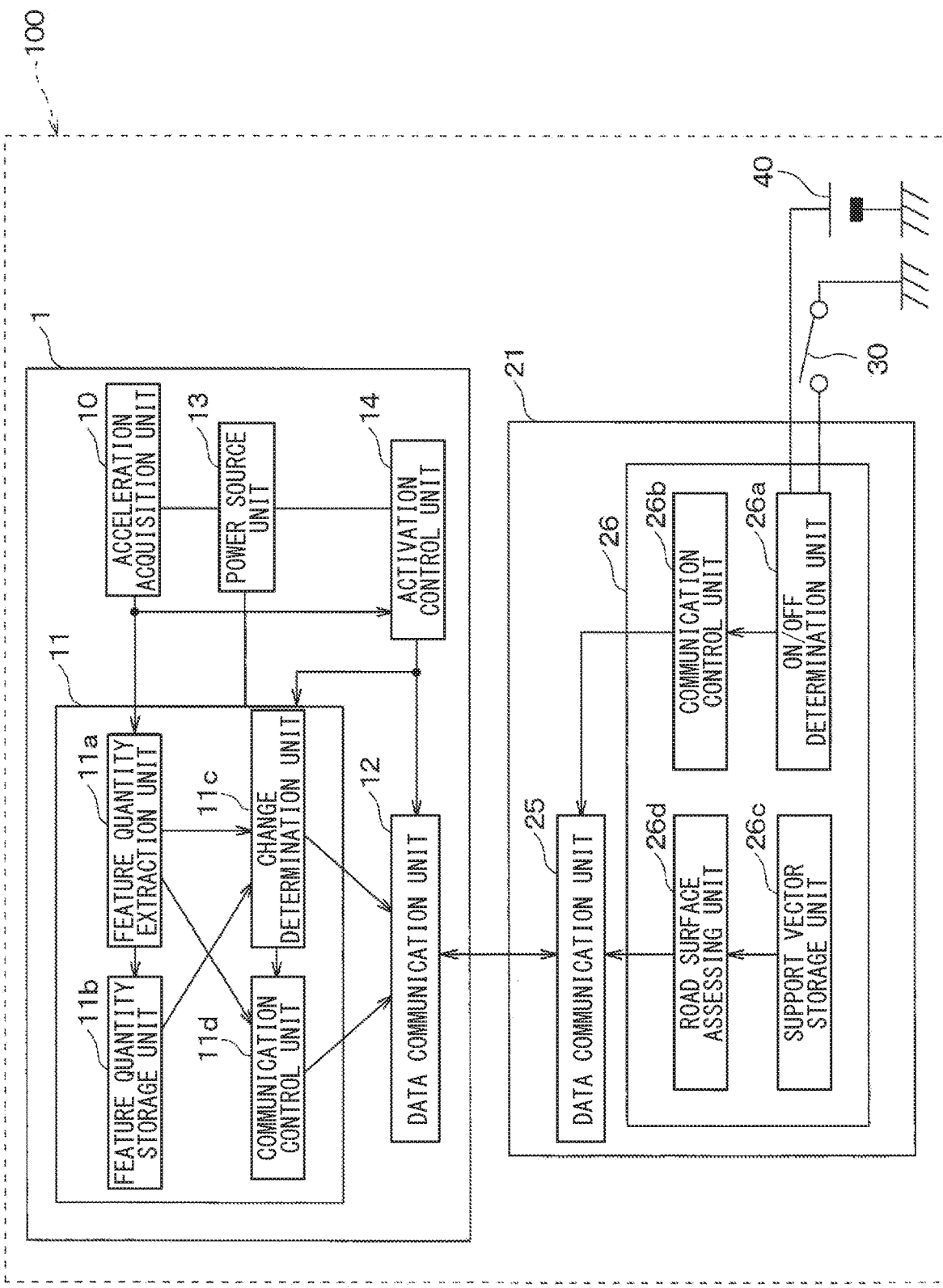
FIG. 2 is a block diagram illustrating respective detailed configurations of the tire-side device and a vehicle-body-side system.

As illustrated in FIGS. 1 and 2, the tire apparatus 100 is configured to include tire-side devices 1 provided in respective wheels and a vehicle-body-side system 2 including individual units provided on a vehicle body side. The vehicle-body-side system 2 includes a receiver 21, an electronic control device for brake control (hereinafter referred to as a brake ECU) 22, a reporting device 23, and the like. Note that a portion of the tire apparatus 100 which implements the road surface condition assessing function corresponds to a road surface condition assessing device. In the case of the first embodiment, each of the tire-side devices 1 and the receiver 21 of the vehicle-body-side system 2 are included in the road surface condition assessing device.

The tire apparatus 100 of the first embodiment causes each of the tire-side devices 1 to transmit data (hereinafter referred to as road surface data) depending on a road surface condition of a road surface on which the tire 3 travels and also causes the receiver 21 to receive the road surface data and assess the road surface condition. Specifically, the tire-side device 1 transmits the road surface data when determining that there is a change in the road surface condition. Then, the receiver 21 receives the road surface data transmitted when there is a change in the road surface condition, and assesses the road surface condition based on the received road surface data.

The tire apparatus 100 transmits a result of the assessment of the road surface condition by the receiver 21 to the reporting device 23, and causes the reporting device 23 to report the result of the assessment of the road surface condition. As a result, it is possible to report a road surface condition such as, e.g., a dry road, a wet road, or a frozen road to a driver and also warn the driver that the road surface traveled thereby is slippery. The tire apparatus 100 also reports the road surface condition to the brake ECU 22 which controls vehicle movement or the like to cause the brake ECU 22 or the like to perform vehicle movement control for avoiding danger. For example, when the road is frozen, the brake ECU 22 or the like is caused to reduce a braking force generated based on an amount of brake operation compared to that when the road is dry and thus perform vehicle movement control corresponding to a case where a road surface p is low. Specifically, the tire-side device 1 and the vehicle-body-side system 2 are configured as follows.

Figure 3:
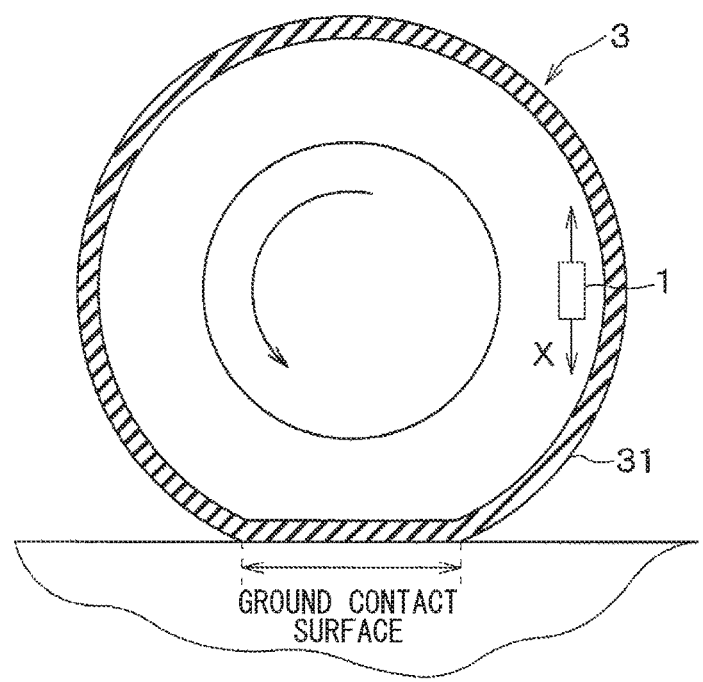
FIG. 3 is a sectional schematic diagram of a tire to which the tire-side device is attached.

The tire-side device 1 is disposed in each of the tires 3 to be capable of bidirectional communication with the vehicle-body-side system 2. Specifically, as illustrated in FIG. 2, the tire-side device 1 is configured to include an acceleration acquisition unit 10, a control unit 11, a data communication unit 12, a power source unit 13, and an activation control unit 14. As illustrated in FIG. 3, the tire-side device 1 is provided on a back surface side of a tread 31 of each of the tires 3.

The acceleration acquisition unit 10 forms a vibration detector for detecting the vibration applied to the tire 3. For example, the acceleration acquisition unit 10 is formed of an acceleration sensor. When the acceleration acquisition unit 10 is formed of the acceleration sensor, the acceleration acquisition unit 10 outputs an acceleration detection signal as a detection signal based on vibration in, e.g., a direction in contact with a circular path followed by the tire-side device 1 when the tire 3 rotates, i.e., a tire tangential direction shown by an arrow X in FIG. 3. More specifically, the acceleration acquisition unit 10 generates, as the detection signal, an output voltage having one of two directions shown by the arrow X as a positive direction and the opposite direction as a negative direction or the like. For example, the acceleration acquisition unit 10 detects an acceleration at predetermined sampling periods which are set to be shorter than a period of one rotation of the tire 3, and outputs the detected acceleration as the detection signal.

The control unit 11 is a portion which corresponds to a first controller, is formed of a known microcomputer including a CPU, a ROM, a RAM, an I/O, and the like, and performs the processes described above based on a program stored in the ROM or the like. The control unit 11 is configured to include, as functional units which perform those processes, a feature quantity extraction unit 11a, a feature quantity storage unit 11b, a change determination unit 11c, and a communication control unit 11d.

The feature quantity extraction unit 11a uses the detection signal output from the acceleration acquisition unit 10 as the detection signal representing vibration data in the tire tangential direction to process the detection signal and thus extract feature quantities of tire vibration. In the case of the first embodiment, by performing signal processing of the detection signal for the acceleration (hereinafter referred to as the tire G) of the tire 3, the feature quantity extraction unit 11a extracts the feature quantities of the tire G. The feature quantity extraction unit 11a transmits, as the road surface data, data including the extracted feature quantities to the data communication unit 12 via the communication control unit 11d. Note that details of the feature quantities mentioned herein will be described later.

The feature quantity storage unit 11b stores the feature quantities (hereinafter referred to as immediately previous feature quantities) extracted by the feature quantity extraction unit 11a before one rotation of each of the tire 3. Since the one rotation made by the tire 3 can be recognized by a method described later, every time the tire 3 rotates once, feature quantities corresponding to the one rotation are stored. Note that, for the feature quantities corresponding to the one rotation of the tire 3, it may be possible to update data thereof every time the tire 3 rotates once or accumulate data corresponding to a plurality of rotations and delete the oldest data every time the tire 3 rotates once. However, in terms of saving a storage capacity of a memory in the control unit 11 in the tire 3, an amount of data to be accumulated is preferably reduced, and therefore data is preferably updated every time the tire 3 rotates once.

The change determination unit 11*c* determines the presence or absence of a change in the road surface condition based on the feature quantities (hereinafter referred to as the most recent feature quantities) extracted by the feature quantity extraction unit 11*a* during the most recent rotation of the tire 3 and on the immediately previous feature quantities of the tire 3 stored in the feature quantity storage unit 11*b*. Then, when determining that there is a change in the road surface condition, the change determination unit 11*c* transmits a control signal indicative of the change to the communication control unit 11*d*.

The communication control unit 11*d* is intended to control communication with the vehicle-body-side system 2 through the data communication unit 12. Specifically, the communication control unit 11*d* controls a connection for performing the bidirectional communication with the receiver 21, i.e., formation/disconnection of a dedicated communication path or controls data communication through the data communication unit 12.

The communication control unit 11*d* senses the rotation of the tire 3, i.e., the travel of the vehicle based on, e.g., an output voltage waveform of the detection signal from the acceleration acquisition unit 10 input to the feature quantity extraction unit 11*a*. Note that a method of sensing the travel of the vehicle will be described later. Then, when the vehicle starts to run, the communication control unit 11*d* performs processing for establishing a connection with the receiver 21, and cuts off the connection based on a disconnection request signal from the receiver 21. After the establishment of the connection, when a control signal representing the occurrence of a change in the road surface condition is transmitted thereto from the change determination unit 11*c*, the communication control unit 11*d* transmits, to the data communication unit 12, the road surface data including the most recent feature quantities extracted at that time by the feature quantity extraction unit 11*a*.

The data communication unit 12 is a portion forming a first transmission/reception unit and performs data communication with a data communication unit 25 described later of the receiver 21 in the vehicle-body-side system 2. The data communication unit 12 described herein has a single configuration, but may also be configured as a transmission unit and a reception unit which are separate from each other. As a mode of the bidirectional communication, various modes can be used appropriately, and Bluetooth communication including BLE (abbreviation of Bluetooth Low Energy) communication, a wireless LAN (abbreviation of Local Area Network) such as wifi, Sub-GHz communication, ultra-wide band communication, ZigBee, or the like can be used appropriately. Note that "Bluetooth" is a registered trademark.

For example, when the road surface data is transmitted from the communication control unit 11*d* thereto, with that timing, the data communication unit 12 performs transmission of the road surface data including the most recent feature quantities. The timing of the data transmission from the data communication unit 12 is controlled by the communication control unit 11*d*, and therefore the data transmission is not performed every time the tire 3 rotates once, but is performed only when there is a change in the road surface condition.

When the disconnection request signal requesting to cut off the connection is transmitted from the data communication unit 25 thereto, the data communication unit 12 receives the disconnection request signal and transmits the disconnection request signal to the communication control unit 11*d*. Thus, the communication control unit 11*d* cuts off the connection of the communication with the receiver 21 based on the transmitted disconnection request signal.

Note that, to each of the tire-side devices 1, unique identification information (hereinafter referred to as the ID information) is allocated. Thus, each of the tire-side devices 1 is allowed to identify whether or not the disconnection request signal is an instruction signal to the tire-side device 1 based on the ID information added to the disconnection request signal. Consequently, on receiving an instruction signal such as a sleep instruction signal to which the ID information of the corresponding tire-side device 1 is added, the data communication unit 12 transmits a signal representing details of the instruction signal to the communication control unit 11*d*.

The power source unit 13 serves as a power source of the tire-side device 1 and supplies power to each of the units included in the tire-side device 1 to operate each of the units. The power source unit 13 is formed of a battery such as, e.g., a button battery. Since the tire-side device 1 is provided in the tire 3, replacement of the battery cannot easily be performed, and therefore it is required to reduce power consumption. It may also be possible to form the power source unit 13 of a power generator, an electrical accumulator, or the like instead of the battery. When the power source unit 13 is configured to have the power generator, a battery life presents fewer problems than when the power source unit 13 is formed of a battery, but it is difficult to generate high power. Accordingly, a task of reducing the power consumption remains the same as when the power source unit 13 is formed of the battery.

The activation control unit 14 activates respective functions of the individual units of the tire-side device 1 and controls sleep thereof. The activation control unit 14 is illustrated herein as a configuration separate from the control unit 11, but the activation control unit 14 may also be configured to be embedded in the control unit 11. Specifically, the activation control unit 14 effects switching to an activated state based on the detection signal from the acceleration acquisition unit 10 and effects switching to a sleep state when the connection with the receiver 21 is cut off as described later. In the activated state, the acceleration acquisition unit 10, the control unit 11, the data communication unit 12, and the activation control unit 14 have the respective functions thereof activated based on the power supply from the power source unit 13. In the sleep state, the control unit 11 and the data communication unit 12 are on sleep. The activation control unit 14 receives the detection signal from the acceleration acquisition unit 10, senses rotation of the tire 3, i.e., running of the vehicle based on the waveform of the detection signal exceeding a predetermined threshold, and switches each of the units that have been on sleep into the activated state on sensing the running of the vehicle. For example, the detection signal from the acceleration acquisition unit 10 represents an output voltage or an output current from the acceleration acquisition unit 10. When the voltage or current input to the activation control unit 14 exceeds a predetermined threshold, the activation control unit 14 activates each of the units. When the connection is cut off, the activation control unit 14 switches the activated control unit 11 and the activated data communication unit 12 to the sleep state.

As a result, when portions of the tire-side device 1, which are the control unit 11 and the data communication unit 12 herein, are in the sleep state, there is no power consumed thereby, and accordingly it is possible to reduce the power consumed by the tire-side device 1.

Note that the portions of the tire-side device 1 which are brought into the sleep state are the portions which implement various arithmetic functions such as waveform processing and a data transmission function. Since the acceleration acquisition unit 10 and the activation control unit 14 are not brought into the sleep state, power is consumed by these units. However, bringing the portions which implement the various arithmetic functions such as the waveform processing and the data transmission function and consume high power into the sleep state is effective in reducing power consumption.

Meanwhile, when an activation switch 30 illustrated in FIG. 2 is turned ON, the receiver 21, the brake ECU 22, and the reporting device 23 which are included in the vehicle-body-side system 2 are operated based on the power supply from a battery 40. When the activation switch 30 is turned OFF, the power supply from the battery 40 is basically turned OFF, and the operation of the receiver 21, the brake ECU 22, and the reporting device 23 is stopped. However, the receiver 21 is configured to be operated for a predetermined period using the power supply from the battery 40 which is continued for a predetermined time or using power stored in a capacitor or the like not shown even when the activation switch 30 is turned OFF. Note that the predetermined time during which the power supply from the battery 40 is continued may be set appropriately to a time which is long enough to allow the disconnection request signal described later to be transmitted. In the case of the first embodiment, the transmission of the disconnection request signal is recognized first, and then the power supply from the battery 40 or the like to the receiver 21 is stopped in a predetermined order. Accordingly, the power supply to the receiver 21 is continued until the disconnection request signal is transmitted and, after the transmission of the disconnection request signal, the power supply to the receiver 21 is stopped.

As illustrated in FIG. 2, the receiver 21 is configured to include the data communication unit 25 and a control unit 26.

The data communication unit 25 is a portion forming a second transmission/reception unit which performs data communication with the tire-side device 1, and performs the function of receiving the road surface data including the most recent feature quantities transmitted from the data communication unit 12 of the tire-side device 1 and transmitting the road surface data to the control unit 26. The data communication unit 25 described herein has a single configuration, but may also be configured to include a transmission unit and a reception unit which are separate from each other.

The control unit 26 corresponds to a second controller, is formed of a known microcomputer including a CPU, a ROM, a RAM, an I/O, and the like, and performs various processes based on programs stored in the ROM or the like. The control unit 26 includes, as functional units which perform the various processes, an ON/OFF determination unit 26a, a communication control unit 26b, a support vector storage unit 26c, and a road surface assessing unit 26d.

The ON/OFF determination unit 26a receives a switch signal representing an ON/OFF state of a switch for bringing the vehicle into a startable state such as the activation switch 30 in the vehicle, i.e., an ignition switch, and determines the ON/OFF state of the activation switch 30 based on the switch signal. Then, the ON/OFF determination unit 26a transmits, to the communication control unit 26b, the switching of the activation switch 30 from the OFF state to the ON state or the switching of the activation switch 30 from the ON state to the OFF state. Note that, before the activation switch 30 is turned ON, the power supply to the receiver 21 is not performed, and therefore the ON/OFF determination unit 26a is not operated. However, when the activation switch 30 is turned ON and the power supply to the receiver 21 is performed, the ON/OFF determination unit 26a is operated. Accordingly, the ON/OFF determination unit 26a determines, immediately after the operation thereof is started, that the activation switch 30 is switched from the OFF state to the ON state based on the switch signal. Also, in the case of the first embodiment, the receiver 21 is configured to remain operated only for the predetermined time even when the activation switch 30 is switched from the ON state to the OFF state. Accordingly, the ON/OFF determination unit 26a determines, based on the switch signal, that the activation switch 30 is switched from the ON state to the OFF state.

When the activation switch 30 is switched from the OFF state to the ON state, the communication control unit 26b performs a process of establishing a connection of communication with each of the tire-side devices 1. When the activation switch 30 is switched from the ON state to the OFF state, the communication control unit 26b outputs a control signal which causes the data communication unit 25 to transmit the disconnection request signal so as to cut off the connection of the communication with each of the tire-side devices 1. Based on this, the disconnection request signal is transmitted from the data communication unit 25 to cut off the connection of the communication with each of the tire-side devices 1.

The support vector storage unit 26c stores and accumulates support vectors for each type of the road surface. The support vectors refer to feature quantities serving as models, which are obtained by, e.g., learning using a support vector machine. The vehicle including the tire-side device 1 is experimentally caused to run on each type of the road surface. The feature quantities extracted at that time by the feature quantity extraction unit 11a and corresponding to a predetermined number of tire rotations are learned and, from the extracted feature quantities, typical feature quantities corresponding to the predetermined number of rotations are extracted to be used as the support vectors. For example, the feature quantities corresponding to 1,000,000 rotations are learned for each type of the road surface and, from the learned feature quantities, typical feature quantities corresponding to 100 rotations are extracted to be used as the support vectors.

The road surface assessing unit 26d compares the most recent feature quantities transmitted from the tire-side device 1 and received by the data communication unit 25 to the respective support vectors stored for each type of the road surface in the support vector storage unit 26c to assess the road surface condition. For example, the road surface assessing unit 26d compares the most recent feature quantities to the support vectors stored for each type of the road surface, and determines the road surface corresponding to the support vectors closest to the most recent feature quantities to be a currently traveled road surface.

When the road surface assessing unit 26d assesses the road surface condition, the control unit 26 transmits the assessed road surface condition to the reporting device 23, and causes the reporting device 23 to report the road surface condition to the driver as required. As a result, the driver tries to drive in consideration of the road surface condition and can avoid danger to the vehicle. For example, the control unit 26 may constantly display the assessed road surface condition through the reporting device 23 or may display the road surface condition to warn the drive only when the assessed road surface condition is that of a wet road, a frozen road, or the like, and the driver is required to drive carefully. In addition, from the receiver 21, the road surface condition is transmitted to an ECU for performing vehicle movement control such as the brake ECU 22 and, based on the transmitted road surface condition, the vehicle movement control is performed.

Note that the brake ECU 22 forms a braking control device which performs various brake control. Specifically, the brake ECU 22 drives an actuator for controlling a brake fluid to increase/decrease a wheel cylinder pressure and thus control the braking force. The brake ECU 22 can also independently control the braking force to each of the wheels. When the road surface condition is transmitted from the receiver 21 thereto, the brake ECU 22 performs, based on the transmitted road surface condition, control of the braking force as the vehicle movement control. For example, when the transmitted road surface condition indicates the frozen road, the brake ECU 22 weakens the braking force to be generated in response to the amount of brake operation performed by the driver compared to the braking force to be generated when the transmitted road surface condition indicates the dry road. Thus, it is possible to inhibit a wheel slip and avoid danger to the vehicle.

The reporting device 23 is formed of, e.g., a meter indicator or the like and used when the road surface condition is reported to the driver. When the reporting device 23 is formed of the meter indicator, the meter indicator is disposed at a place where the meter indicator is visually recognizable by the driver while driving the vehicle and disposed in, e.g., an instrument panel in the vehicle. The meter indicator performs, when the road surface condition is transmitted thereto from the receiver 21, display in a mode in which the driver can recognize the road surface condition, and thus allows the road surface condition to be visually reported to the driver.

Note that the reporting device 23 may also be formed of a buzzer, a voice guidance device, or the like. In that case, the reporting device 23 can aurally report the road surface condition to the driver using the buzzer or the voice guidance device. As the reporting device 23 that performs visual reporting, the meter indicator has been described by way of example, but the reporting device 23 may also be formed of a display element which displays information, such as a head-up display.

Thus, the tire apparatus 100 according to the first embodiment is configured. Note that the individual units included in the vehicle-body-side system 2 are connected to each other via an in-vehicle LAN (abbreviation of Local Area Network) based on, e.g., CAN (abbreviation of Controller Area Network) communication. This allows the individual units to transmit information to each other via the in-vehicle LAN.

Next, a description will be given of details of the feature quantities extracted by the feature quantity extraction unit 11a described above and of the determination of a change in the road surface condition by the change determination unit 11c.

First, a description will be given of the feature quantities extracted by the feature quantity extraction unit 11a. The feature quantities mentioned herein are quantities representing features of vibration applied to the tire 3, which have been acquired by the acceleration acquisition unit 10, and are represented as, e.g., the feature vectors.

Figure 4:
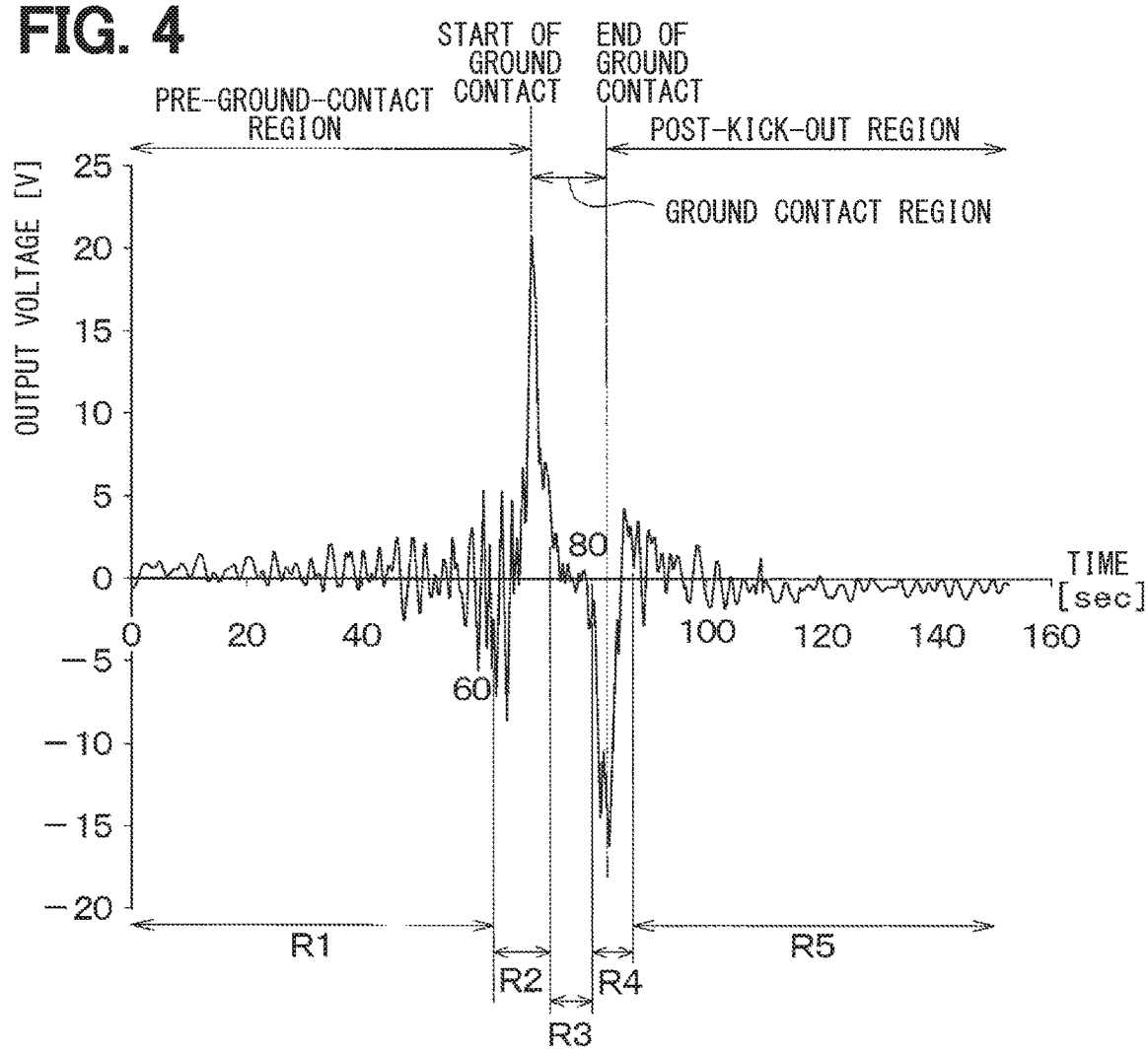
FIG. 4 is a waveform chart of an output voltage from an acceleration acquisition unit during tire rotation.

The output voltage waveform of the detection signal from the acceleration acquisition unit 10 during tire rotation is, e.g., the waveform illustrated in FIG. 4. As illustrated in the drawing, at a ground contact start time when a portion of the tread 31 corresponding to a place where the acceleration acquisition unit 10 is disposed starts to come into contact with the ground with the rotation of the tire 3, the output voltage from the acceleration acquisition unit 10 has a maximum value. A peak value at the ground contact start time when the output voltage from the acceleration acquisition unit 10 has the maximum value is hereinafter referred to as a first peak value. As also illustrated in FIG. 4, at a ground contact end time when the portion of the tread 31 corresponding to the place where the acceleration acquisition unit 10 is disposed, which has been in contact with the ground, comes out of contact with the ground, the output voltage from the acceleration acquisition unit 10 has a minimum value. A peak value at the ground contact end time when the output voltage from the acceleration acquisition unit 10 has the minimum value is hereinafter referred to as a second peak value.

The following is the reason why the output voltage from the acceleration acquisition unit 10 has the peak values with the timings described above. That is, when the portion of the tread 31 corresponding to the place where the acceleration acquisition unit 10 is disposed comes into contact with the ground with the rotation of the tire 3, a portion of the tire 3 which has been a generally cylindrical surface in the vicinity of the acceleration acquisition unit 10 receives pressure to be deformed into a planar shape. At this time, the acceleration acquisition unit 10 receives an impact, and consequently the output voltage from the acceleration acquisition unit 10 has the first peak value. On the other hand, when the portion of the tread 31 corresponding to the place at which the acceleration acquisition unit 10 is disposed comes out of contact with the ground contact surface, the tire 3 is released from the pressure in the vicinity of the acceleration acquisition unit 10 and returned from the planar shape to a generally cylindrical shape. The acceleration acquisition unit 10 receives an impact when the tire 3 is returned to the original shape, and consequently the output voltage from the acceleration acquisition unit 10 has the second peak value. Thus, the output voltage from the acceleration acquisition unit 10 has the first and second peak values at the ground contact start time and the ground contact end time. In addition, since the direction of the impact when the tire 3 receives the pressure is opposite to the direction of the impact when the tire 3 is released from the pressure, reference numerals of the output voltages are also opposite to each other.

A moment when the portion of the tire tread 31 corresponding to the place where the acceleration acquisition unit 10 is disposed comes into contact with the ground at the road surface is assumed to fall within a "step-on region", while a moment when the portion of the tire tread 31 corresponding to the place where the acceleration acquisition unit 10 is disposed leaves the road surface is assumed to fall within a "kick-out region". The "step-on region" includes the timing with which the first peak value is reached, while the "kick-out region" includes the timing with which the second peak value is reached. It is also assumed that a region before the "step-on region" is a "pre-step-on region", a region between the step-on region and the kick-out region, i.e., a region where the portion of the tire tread 31 corresponding to the place where the acceleration acquisition unit 10 is disposed is in contact with the ground is a "pre-kick-out region", and a region after the kick-out region is a "post-kick-out region" Thus, a period during which the portion of the tire tread 31 corresponding to the place where the acceleration acquisition unit 10 is disposed is in contact with the ground and periods before and after the period can be segmented into the five regions. Note that, in FIG. 4, the "pre-step-on region", the "step-on region", the "pre-kick-out region", the "kick-out region", and the "post-kick-out region" of the detection signal are successively shown as five regions R1 to R5.

Depending on the road surface condition, vibration occurred in the tire 3 varies from one of the regions resulting from the segmentation to another, and the detection signal from the acceleration acquisition unit 10 varies from one of the regions to another. Accordingly, by subjecting the detection signal from the acceleration acquisition unit 10 in each of the regions to frequency analysis, the road surface condition of the road surface traveled by the vehicle is detected. For example, in a slippery road surface condition such as that of a hard-compacted snow road, a sheering force at a kick-out time deteriorates, and consequently a band value selected in a 1 kHz to 4 kHz band decreases in the kick-out region R4 and the post-kick-out region R5. Thus, each of frequency components of the detection signal from the acceleration acquisition unit 10 varies depending on the road surface condition, and therefore it is possible to determine the road surface condition based on the frequency analysis of the detection signal.

Figure 5:
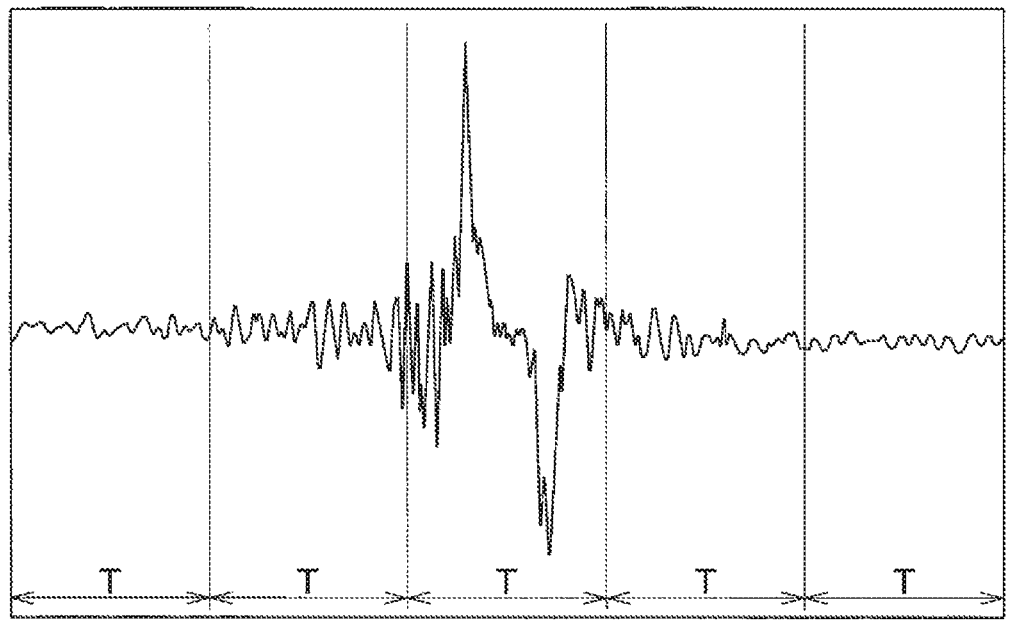
FIG. 5 is a diagram illustrating a detection signal from the acceleration acquisition unit which is segmented by each of time windows having a predetermined time width T.

Accordingly, the feature quantity extraction unit 11a segments, by each of time windows having a predetermined time width T, the detection signal from the acceleration acquisition unit 10 corresponding to one rotation of the tire 3 which exhibits a continuous time axis waveform into the plurality of segments as illustrated in FIG. 5, and performs the frequency analysis in each of the segments to extract the feature quantities. Specifically, by performing the frequency analysis in each of the segments, the feature quantity extraction unit 11a determines a power spectral value in each of the frequency bands, i.e., a vibration level in a specified frequency band, and uses the power spectral values as the feature quantities.

Note that the number of the segments resulting from the segmentation performed using the time window having the time width T is a value which varies depending on a vehicle speed, more specifically the rotating speed of the tire 3. In the following description, the number of segments corresponding to one rotation of the tire is assumed to be n (n is a natural number).

For example, the power spectral values obtained by causing the detection signal in each of the regions to pass through filters in a plurality of specified frequency bands, e.g., five bandpass filters in, e.g., a 0 to 1 kHz frequency band, a 1 to 2 kHz frequency band, a 2 to 3 kHz frequency band, a 3 to 4 kHz frequency band, and a 4 to 5 kHz frequency band are used as the feature quantities. The feature quantities are referred to as the feature vectors. When each of the power spectral values in the individual specified frequency bands is represented by $a_{ik}$, a feature vector $X_i$ of a given segment $i$ (where $i$ is a natural number satisfying $1 \leq i \leq n$) is given as a matrix having the power spectral values $a_{ik}$ as elements by the following expression.

$$X_i = \begin{bmatrix} a_{i1} \\ a_{i2} \\ a_{i3} \\ a_{i4} \\ a_{i5} \end{bmatrix} \quad \text{[Expression 1]}$$

Note that k in each of the power spectral values $a_{ik}$ is the number of the specified frequency bands, i.e., the number of the bandpass filters. When the 0 to 5 kHz band is segmented into the five regions as described above, k=1 to 5 is satisfied. A determinant X collectively showing feature vectors X1 to Xn of all the segments 1 to n is given by the following expression.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Expression 2]}$$

The determinant X serves as the expression representing the feature quantities corresponding to one tire rotation. The feature quantity extraction unit 11a performs frequency analysis of the detection signal from the acceleration acquisition unit 10 to extract the feature quantities represented by the determinant X.

Subsequently, a description will be given of determination of a change in the road surface condition, which is performed by the change determination unit 11c. The determination is made by calculating a degree of similarity using the most recent feature quantities extracted by the feature quantity extraction unit 11a and the immediately previous feature quantities stored in the feature quantity storage unit 11b.

As described above, it is assumed with respect to the determinant X representing the feature quantities that a determinant representing the most recent feature quantities is X(r), a determinant representing the immediately previous feature quantities is X(r−1), and the power spectral values $a_{ik}$ serving as respective elements of each of the determinants are represented by $a(r)_{ik}$ and $a(r-1)_{ik}$. In that case, the determinant X(r) representing the most recent feature quantities and the determinant X(r−1) representing the immediately previous feature quantities are represented as follows.

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Expression 3]}$$

$$X(r-1) = \begin{pmatrix} a(r-1)_{11} & a(r-1)_{21} & \cdots & a(r-1)_{n1} \\ a(r-1)_{12} & a(r-1)_{22} & \cdots & a(r-1)_{n2} \\ a(r-1)_{13} & a(r-1)_{23} & \cdots & a(r-1)_{n3} \\ a(r-1)_{14} & a(r-1)_{24} & \cdots & a(r-1)_{n4} \\ a(r-1)_{15} & a(r-1)_{25} & \cdots & a(r-1)_{n5} \end{pmatrix} \quad \text{[Expression 4]}$$

The degree of similarity represents a degree to which the feature quantities represented by the two determinants are similar to each other, and indicates that, as the degree of similarity is higher, the two determinants are more similar to each other. In the case of the first embodiment, the change determination unit 11c determines the degree of similarity using a kernel method, and determines a change in the road surface condition based on the degree of similarity. The change determination unit 11c calculates herein an inner product of the determinant X(r) during the most recent rotation of the tire 3 and the determinant X(r−1) during the immediately previous rotation of the tire 3, i.e., a distance between respective coordinates represented by the individual feature vectors Xi of the individual segments resulting from the segmentation performed using each of the time windows having the predetermined time width T in a feature space, and uses the inner product as the degree of similarity.

Figure 6:
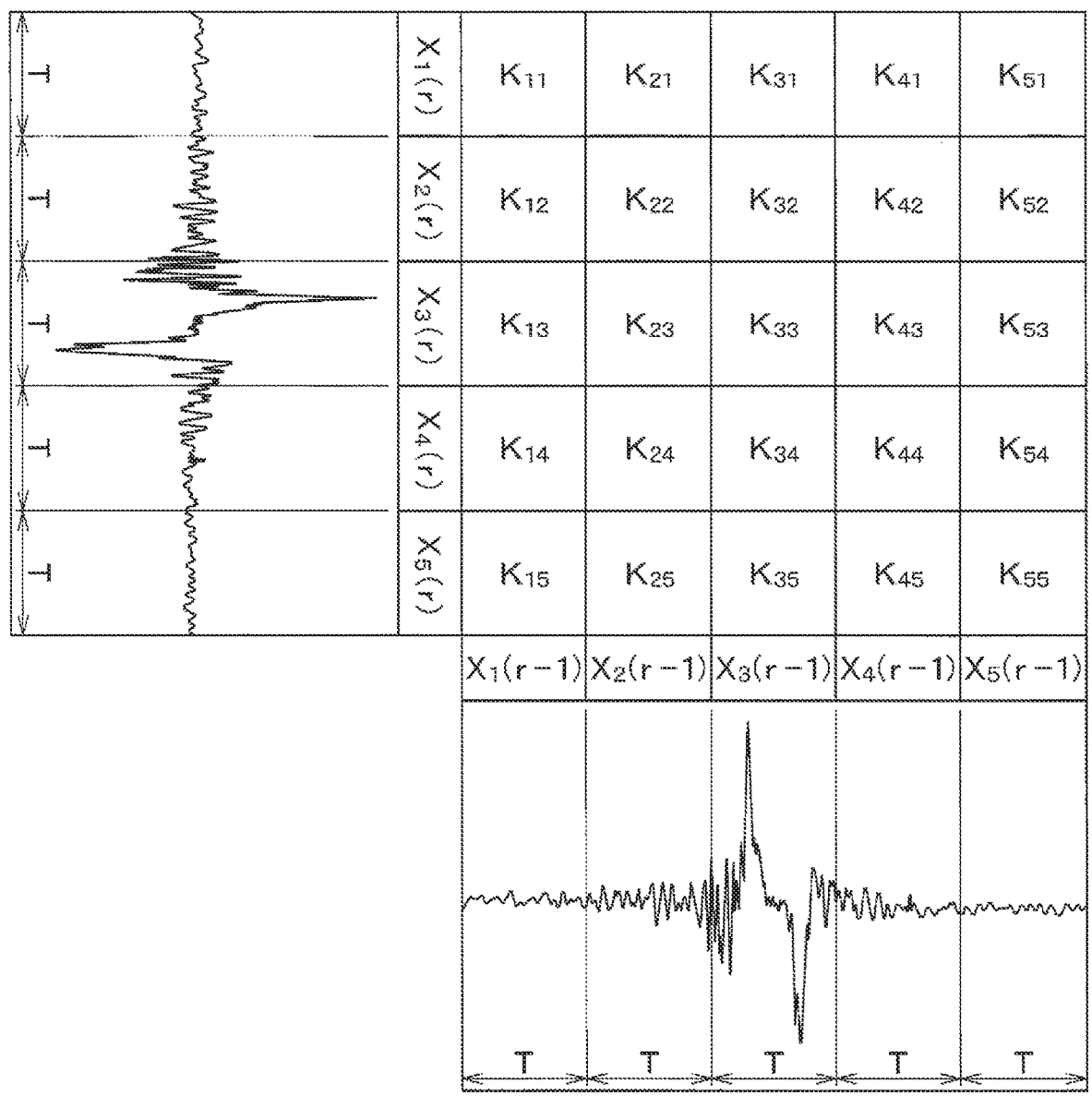
FIG. 6 is a graph illustrating relationships between determinants $Xi(r)$ and $Xi(r-1)$ and a distance $K_{yz}$ in each of segments resulting from segmentation of a time axis waveform during a most recent rotation of the tire and a time axis waveform during an immediately previous rotation of the tire by each of the time windows having the predetermined time width T.

For example, as illustrated in FIG. 6, as the time axis waveform of the detection signal from the acceleration acquisition unit 10, each of the time axis waveform during the most recent rotation of the tire 3 and the time axis waveform during the immediately previous rotation of the tire 3 is segmented into individual segments by the time window having the predetermined time width T. In the case of the illustrated example, each of the time axis waveforms is segmented into the five segments, and accordingly n=5 is satisfied, and i satisfies 1≤i≤5. It is assumed herein that, as illustrated in the drawing, the feature vectors Xi of the individual segments during the most recent rotation are Xi(r), and the feature vectors of the individual segments during the immediately previous rotation are Xi(r−1). In that case, distances $K_{yz}$ between the coordinates represented by the feature vectors Xi of the individual segments are represented as in cells where cells containing the feature vectors Xi(r) of the individual segments during the most recent rotation, which are arranged laterally thereto, and cells containing the feature vectors Xi(r−1) of the individual segments during the immediately previous rotation, which are arranged vertically thereto, cross each other. Note that, in each of the distances $K_{yz}$, y corresponds to i in Xi(r−1), while z corresponds to i in Xi(r). In addition, there is no significant change between a vehicle speed during the most recent rotation and a vehicle speed during the immediately previous rotation, and therefore the number of the segments during the most recent rotation is basically equal to the number of the segments during the immediately previous rotation.

In the case of the first embodiment, the feature vectors Xi are acquired by segmenting each of the time axis waveforms into the five specified frequency bands, and consequently the feature vectors Xi of the individual segments are represented in a six-dimensional space including the time axis. Accordingly, the distances between the coordinates represented by the feature vectors Xi of the individual segments correspond to distances between the coordinates in the six-dimensional space. However, since the distances between the coordinates represented by the feature vectors Xi of the individual segments are smaller as the feature quantities are more similar to each other, smaller distances represent a higher degree of similarity, while larger distances represent a lower degree of similarity.

For example, when segments 1 to n are provided by time division, each of the distances $K_{yz}$ between the coordinates represented by the feature vectors of the individual segments 1 is given by the following expression.

Thus, the distances $K_{yz}$ between the coordinates represented by the feature vectors of the individual segments obtained by time division are determined for all the segments, a total sum $K_{total}$ of the distances $K_{yz}$ for all the segments is arithmetically determined, and the total $K_{total}$ is used as a value corresponding to the degree of similarity. Then, the total sum $K_{total}$ is compared to a predetermined threshold Th and, when the total sum $K_{total}$ is larger than the threshold Th, it is determined that the degree of similarity is low and there is a change in the road surface condition. When the total sum $K_{total}$ is smaller than the threshold Th, it is determined that the degree of similarity is high and there is no change in the road surface condition.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of segments, can be used. Alternatively, as shown in Patent Document 1, it is also possible to determine the degree of similarity using various kernel functions. Still alternatively, it may also be possible to arithmetically determine the degree of similarity by removing paths having lower degrees of similarity from all the feature vectors without using all the feature vectors.

Subsequently, a description will be given of an operation of the tire apparatus 100 according to the first embodiment with reference to FIGS. 7 and 8.

First, a description will be given of an operation when, after the driver turns ON the activation switch 30 in a state where the vehicle is at a halt and the vehicle starts to run, the driver stops the vehicle and turns OFF the activation switch 30.

Figure 7:
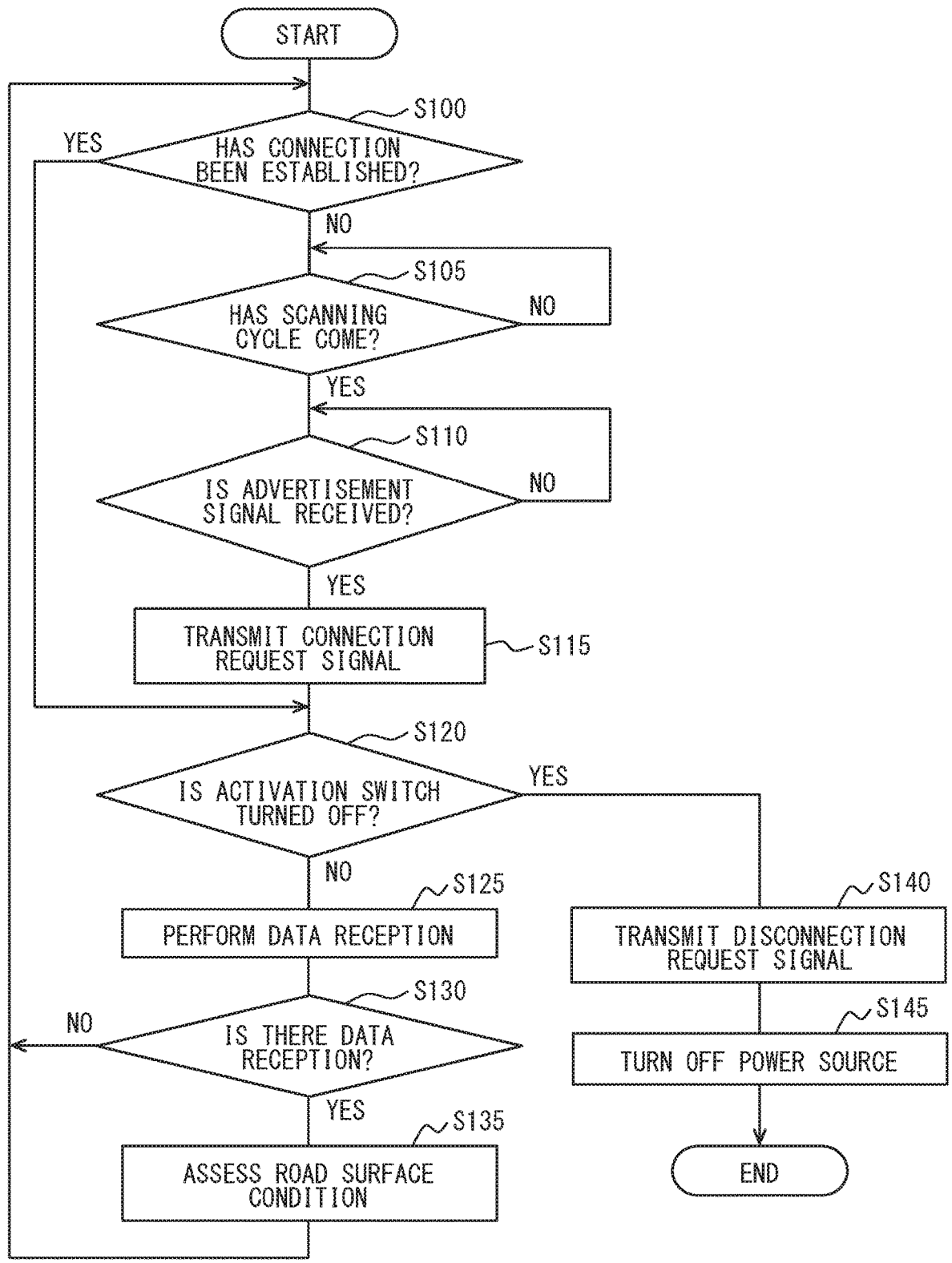
FIG. 7 is a flow chart of a vehicle-body-side process to be performed by a control unit of the vehicle-body-side system.

In the vehicle-body-side system 2, the control unit 26 of the receiver 21 performs a vehicle-body-side process illustrated in FIG. 7. This process is performed in each predetermined control cycle when, as a result of the turning ON of the activation switch 30, power is supplied from the battery 40 to activate the receiver 21 and the like. Meanwhile, each of the tire-side devices 1 performs a tire-side process illustrated in FIG. 8. Note that the following will sequentially describe each of the processes in FIGS. 7 and 8 along a time series.

First, as a result of the turning ON of the activation switch 30, power is supplied from the battery 40 to activate the receiver 21 and the like, and the vehicle-body-side process illustrated in FIG. 7 is performed. Then, in Step S100, the control unit 26 determines whether or not a connection has been established. Immediately after the receiver 21 is activated, the connection has not been established yet, and accordingly the control unit 26 advances to Step S105. On the other hand, when the connection has been established based on a process described later, the control unit 26 advances to Step S120.

In Step S105, the control unit 26 determines whether or not a scanning cycle has come. Scanning is a process which reads data transmitted from the tire-side device 1. The $$Kyz = \sqrt{[a(r)_{11} - a(r-1)_{11}]^2 + [a(r)_{12} - a(r-1)_{12}]^2 + \ldots [a(r)_{15} - a(r-1)_{15}]^2}$$

[Expression 5]

control unit 26 is configured to repeatedly perform the scanning in each predetermined scanning cycle. When making a negative determination in Step S105, the control unit 26 repeats the process while, when making an affirmative determination in Step S105, the control unit 26 advances to Step S110 and steps subsequent thereto.

Meanwhile, in each of the tire-side devices 1, when the vehicle starts to run and, e.g., the output voltage of the detection signal from the acceleration acquisition unit 10 exceeds a predetermined threshold, the activation control unit 14 activates the control unit 11 and the data communication unit 12. As a result, the tire-side process illustrated in FIG. 8 is performed.

First, in Step S200, the control unit 11 determines whether or not the vehicle is running. This process is performed based on the detection signal from the acceleration acquisition unit 10. For example, the control unit 11 determines that the vehicle is running when the output voltage waveform of the detection signal exhibits a waveform corresponding to one tire rotation. Note that the control unit 11 determines one rotation made by the tire 3 based on the time axis waveform of the detection signal from the acceleration acquisition unit 10. Specifically, since the detection signal exhibits the time axis waveform illustrated in FIG. 4, by recognizing the first peak value and the second peak value of the detection signal, it is possible to recognize one rotation of the tire 3. In addition, since the rotation made by the tire 3 is synonymous to running of the vehicle, it is possible to sense whether the vehicle is running or stopped based on the rotation of the tire 3.

When the vehicle has started to run or the running is continued, the control unit 11 makes an affirmative determination and advances to Step S205. When making a negative determination, the control unit 11 repeats the process in Step S200. Note that, when the vehicle has started to run, the control unit 11 or the like is activated in the activation control unit 14 to perform the tire-side process. Accordingly, when the tire-side process is performed, the situation is the same as when the vehicle has started to run. Therefore, it may also be possible to omit a process in the current step and allow a process in subsequent Step S205 to be performed. However, even when a voltage exceeding a threshold is input as noise to the activation control unit 14, it may also be possible to perform the tire-side process and keep the control unit 11 and the data communication unit 12 from being brought into the sleep state. In such a case, it is preferred to perform the process in Step S200.

Next, in Step S205, the control unit 11 determines whether or not a connection has been established. At this stage, the connection has not been established yet, and consequently the control unit 11 makes a negative determination in the current process, and advances to Step S210. However, when the connection is established in Step S225 described later, the control unit 11 makes an affirmative determination in the current process, and advances to Step S230.

In subsequent Step S210, a process of transmitting an advertisement signal is performed. This process brings each of the tire-side devices 1 into a reception standby state such that, after transmitting the advertisement signal, the tire-side device 1 can receive a connection request signal described later which is scheduled to be transmitted later from the vehicle-body-side system 2. The advertisement signal is a signal serving as a keyword to be used when a connection is established between the tire-side device 1 and the receiver 21, which serves as a signal requesting the receiver 21 to transmit the connection request signal. For example, when BLT communication is used appropriately as the bidirectional communication, an advertisement signal in a 2.4 GHz frequency band is transmitted at short periods a plurality of times. The advertisement signal includes ID information to allow the receiver 21 to recognize that the advertisement signal is from the tire-side device 1 of the subject vehicle to which the tire device 100 is equipped.

Returning back to the vehicle-body-side process in FIG. 7, in Step S110, the control unit 26 determines whether or not the advertisement signal from each of the tire-side devices 1 is received. As described above, when the advertisement signal is transmitted from each of the tire-side devices 1, the receiver 21 receives the advertisement signals from the individual tire-side devices 1 in all the four wheels, and the control unit 26 makes an affirmative determination in Step S110 and advances to Step S115. Note that, when receiving the advertisement signals from the tire-side devices 1 in all the four wheels, the control unit 26 basically makes an affirmative determination in Step S110. However, when the control unit 26 assesses the road surface condition, it is sufficient that the control unit 26 obtains the road surface data from at least one of the tire-side devices 1. Accordingly, when receiving the advertisement signal from at least one of the tire-side devices 1, the control unit 26 may also make an affirmative determination in Step S110.

Then, in Step S115, the control unit 26 transmits the connection request signal for establishing a connection with each of the tire-side devices 1. The connection request signal is an instruction signal for causing each of the tire-side devices 1 to perform a process of establishing the connection, which is a signal including an ID signal for the corresponding tire-side device 1. As a result of performance of this process, the connection request signal is transmitted toward each of the tire-side devices 1 through the data communication unit 25. Note that, since the connection is established by this process, a flag indicative of the established connection or the like is set to allow the establishment of the connection to be determined in Step S100 thereafter.

Figure 8:
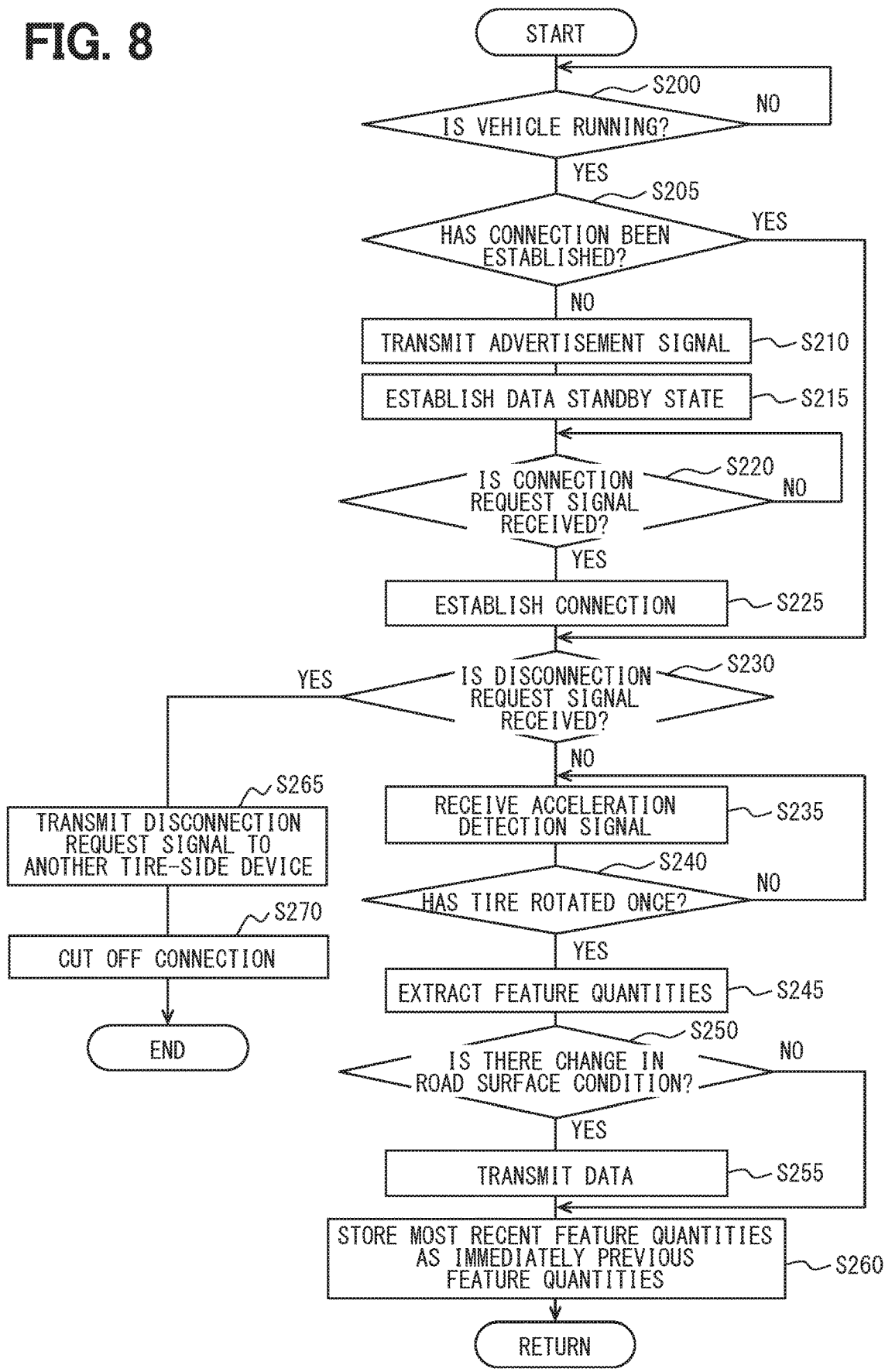
FIG. 8 is a flow chart of a tire-side process to be performed by a control unit of the tire-side device.

Meanwhile, in the tire-side process in FIG. 8, in Step S215, the control unit 11 is brought into a data standby state to receive the connection request signal. Then, when the connection request signal is transmitted from the receiver 21 as described above, the control unit 11 makes an affirmative determination in Step S220, advances to Step S225, and forms the connection. As a result, a dedicated communication path is formed between each of the tire-side devices 1 and the receiver 21 to allow for communication of even large-capacity data.

Then, the control unit 11 advances to Step S230 and determines whether or not the disconnection request signal is received. In this process, when the disconnection request signal is transmitted from the receiver 21 in Step S140 in FIG. 7 described later and the disconnection request signal is received, the control unit 11 makes an affirmative determination. However, since the disconnection request signal is not transmitted yet at this stage, the control unit 11 makes a negative determination. Accordingly, the control unit 11 advances to Step S235 and performs a process of receiving the detection signal from the acceleration acquisition unit 10. This process is continued during a period before the tire 3 rotates once in subsequent Step S240. Then, when receiving the detection signal corresponding to one tire rotation from the acceleration acquisition unit 10, the control unit 11 advances to Step S245 and extracts, as the most recent feature quantities, the feature quantities of the time axis waveform of the received detection signal from the acceleration acquisition unit 10 corresponding to the one tire rotation. Note that the one rotation made by the tire 3 can be determined based on the method described above.

Note that the road surface condition appears as a change in the time axis waveform of the detection signal particularly during a period including the "step-on region", the "pre-kick-out region", the "kick-out region", and periods before and after these regions. Accordingly, it is sufficient that data during this period is received, and it is not necessarily required that all the data sets represented by the detection signal from the acceleration acquisition unit 10 during one tire rotation are received. For example, with respect to the "pre-step-on region" and the "post-kick-out region", it is sufficient that there is only data in the vicinity of the "step-on region" and in the vicinity of the "kick-out region". Therefore, it may also be possible to regard a region of the detection signal from the acceleration acquisition unit 10 where the vibration level is smaller than a threshold as a period included in the "pre-step-on region" or the "post-kick-out region" during which the detection signal is less likely to be affected by the road surface condition and restrict the detection signal from being received.

The extraction of the feature quantities performed in Step S245 is performed exactly in accordance with the method described above.

Then, the control unit 11 advances to Step S250, determines the degree of similarity based on the most recent feature quantities and on the immediately previous feature quantities in accordance with the method described above, and compares the degree of similarity to, e.g., the threshold Th to determine whether or not there is a change in the road surface condition. This process is performed based on the most recent feature quantities extracted by the feature quantity extraction unit 11a and on the immediately previous feature quantities stored in the feature quantity storage unit 11b in Step S260 described later.

Then, when making an affirmative determination in Step S250, the control unit 11 performs a data transmission process in Step S255. Specifically, the control unit 11 causes the communication control unit 11d to transmit the road surface data including the most recent feature quantities to the data communication unit 12. As a result, the data communication unit 12 transmits the road surface data including the most recent feature quantities. Thus, the data communication unit 12 is configured to transmit the road surface data including the most recent feature quantities only when there is a change in the road surface condition. The data communication unit 12 is configured not to perform data transmission when there is no change in the road surface condition. This can reduce a communication frequency and save power for the control unit 11 in the tire 3.

The control unit 11 further advances to Step S260, stores the most recent feature quantities as the immediately previous feature quantities in the feature quantity storage unit 11b, and ends the process. Thereafter, the control unit 11 performs each of the processes in Step S200 and the subsequent steps in each predetermined control cycle. Then, since the connection has already been established, the control unit 11 omits the processes in Steps S210 to S225 for establishing a connection, and extracts the feature quantities. Every time the road surface condition changes, the control unit 11 transmits the road surface data including the feature quantities to the vehicle-body-side system 2.

Meanwhile, in the vehicle-body-side process in FIG. 7, in Step S120, the control unit 26 determines whether or not the activation switch 30 is switched to the OFF state. When the activation switch 30 is not switched to the OFF state, the control unit 26 advances to Step S125.

In Step S125, the control unit 26 performs a data reception process. This process is performed by the control unit 26 by retrieving the road surface data when the data communication unit 25 receives the road surface data. When the data communication unit 25 does not perform the data reception, the control unit 26 ends the current process without retrieving any road surface data.

Then, the control unit 26 advances to Step S130, determines whether or not there is the data reception, and advances to Step S135 when there is the data reception. When there is no data reception, the control unit 26 repeats the processes in the individual steps described above until data is received.

Then, in Step S135, the control unit 26 assesses the road surface condition. The control unit 26 performs the assessment of the road surface condition by comparing the most recent feature quantities included in the received road surface data to the support vectors stored for each type of the road surface in the support vector storage unit 26c. For example, the control unit 26 determines the degrees of similarity of the most recent feature quantities to all the support vectors stored for each type of the road surface, and assesses that the road surface corresponding to the support vectors having the highest degree of similarity is the currently traveled road surface. For the arithmetic determination of the degrees of similarity made at this time, the same method as used for the arithmetic determination of the degree of similarity of the most recent feature quantities to the immediately previous feature quantities made in Step S250 in FIG. 8 may be used appropriately.

When determining that the activation switch 30 is switched to the OFF state in Step S120 as a result of stopping of the vehicle and subsequent turning OFF of the activation switch 30 by the driver, the control unit 26 advances to Step S140. Then, in Step S140, the control unit 26 transmits the disconnection request signal for cutting off the connection with each of the tire-side devices 1. The disconnection request signal is the instruction signal for causing the tire-side device 1 to perform a process of cutting off the connection, which includes the ID signal for the corresponding tire-side device 1. By performing this process, the control unit 26 transmits the disconnection request signal toward each of the tire-side devices 1 through the data communication unit 25. Since the connection is cut off by this process, the control unit 26 determines that a connection not established in Step S100 thereafter.

Then, the control unit 26 advances to Step S145, stops the power supply from the battery 40 or the like to the receiver 21 to turn OFF the power source of the receiver 21, and ends the vehicle-body-side process.

When the disconnection request signal is transmitted, in the tire-side process in FIG. 8, the control unit 11 determines that the disconnection request signal is received in Step S230, and advances to Step S265. Then, in Step S265, each of the tire-side devices 1 transmits the disconnection request signal to another tire-side device 1 other than the transmitter tire-side device 1, advances to Step S270, and voluntarily cuts off the data communication. Thus, the connection is cut off, the activation control unit 14 switches the control unit 11 and the data communication unit 12 to the sleep state, and the tire-side process is ended.

Thus, when the activation switch 30 is turned OFF, the connection is cut off. Accordingly, it is possible to reduce power consumption. Not only the connection is cut off, but also the control unit 11 and the data communication unit 12 are brought into the sleep state. This can further reduce the power consumption.

Moreover, when each of the tire-side devices 1 cuts off the connection, the tire-side device 1 is caused to transmit the disconnection request signal to the other tire-side device 1. This allows all the tire-side devices 1 to more reliably cut off the connection. For example, when the receiver 21 transmits the disconnection request signal, it may not be always true that that all the tire-side devices 1 receive the disconnection request signal. In other words, there is a possibility that any of the tire-side devices 1 is at a Null position at which reception of a radio wave from the receiver 21 is difficult. Accordingly, by causing each of the tire-side devices 1 to additionally perform the process of transmitting the disconnection request signal to the other tire-side device 1, it is possible to more reliably cut off the connection between each of the tire-side devices 1 and the receiver 21.

Note that, when each of the tire-side devices 1 transmits the disconnection request signal to the tire-side device 1 other than the transmitter tire-side device 1, it is preferred that each of the tire-side devices 1 has ID information of the other tire-side device 1 and transmits the disconnection request signal including the ID information of the other tire-side device 1. This allows each of the tire-side devices 1 to recognize the disconnection request signal transmitted thereto is addressed thereto based on the ID information included in the disconnection request signal. In other words, each of the tire-side devices 1 can determine whether the disconnection request signal is transmitted from the tire-side device 1 of the subject vehicle or from the tire-side device 1 of another vehicle. Since the receiver 21 stores the ID information of all the tire-side devices 1 of the subject vehicle, when the receiver 21 transmits the ID information of the other tire-side device 1 of the subject vehicle to each of the tire-side devices 1 and causes each of the tire-side devices 1 to store the ID information, each of the tire-side devices 1 can have the ID information of the other tire-side device 1. By thus causing the disconnection request signal to include the ID information of the tire-side devices 1 of the subject vehicle when the disconnection request is made, it is possible to restrict each of the tire-side devices 1 from cutting off the connection by mistake in response to the disconnection request signal from the tire-side device 1 of another vehicle.

Note that the transmission of the disconnection request signal from each of the tire-side devices 1 to the other tire-side device 1 is not indispensable. It may also be possible that each of the tire-side devices 1 merely cuts off the connection. When large-capacity-data communication is performed with each of the tire-side devices 1, it follows that a connection is established in advance. However, when the disconnection request signal is to be merely transmitted, a required amount of data is small, and consequently it is not required to establish a connection. It is sufficient to establish a reception mode to allow data from the other tire-side device 1 to be received.

Thus, the assessment of the road surface condition by the tire apparatus 100 according to the first embodiment is performed. In performing such assessment of the road surface condition, when the activation switch 30 is turned ON, a connection is established between each of the tire-side devices 1 and the vehicle-body-side system 2 to allow data communication to be performed therebetween. Then, when the activation switch 30 is switched to the OFF state, the vehicle-body-side system 2 transmits the disconnection request signal to each of the tire-side devices 1.

Since each of the tire-side devices 1 is provided in the tire 3, the tire-side device 1 cannot recognize the ON/OFF state of the activation switch 30, and therefore tries to maintain the connection. However, by transmitting the disconnection request signal from the vehicle-body system 2 to each of the tire-side devices 1 using the bidirectional communication when the activation switch 30 is turned OFF, even the tire-side device 1 can recognize that the activation switch 30 is turned OFF. Accordingly, it is possible to restrict each of the tire-side devices 1 from trying to maintain the connection even after the activation switch 30 is switched to the OFF state and allow each of the tire-side devices 1 to cut off the connection. Therefore, it is possible to provide the tire apparatus 100 including the road surface condition assessing device which can reduce power consumed by the tire-side device 1.

In addition, when the activation switch 30 is turned OFF, each of the tire-side devices 1 is not only caused to cut off the connection, but also brings the control unit 11 and the data communication unit 12 into the sleep state. This can further reduce the power consumed by the tire-side device 1.

Moreover, the timing of transmission of the road surface data from each of the tire-side devices 1 is set such that the transmission of the road surface data including the most recent feature quantities from the tire-side device 1 is performed only with the timing with which the road surface condition has changed. Specifically, only with the timing with which it is determined that the road surface condition has changed in the tire-side device 1, the transmission of the road surface data from the tire-side device 1 is performed. Consequently, it is possible to reduce the frequency of communication and further save power for the control unit 11 in the tire 3.

Second Embodiment

A description will be given of a second embodiment. In the second embodiment, each of the tire-side devices 1 according to the first embodiment is also allowed to cut off the connection based on the determination made thereby. The second embodiment is otherwise the same as the first embodiment, and therefore a description is given only of portions different from those in the first embodiment.

A configuration of the tire apparatus 100 including the tire-side devices 1 and the vehicle-body-side system 2 in the second embodiment is the same as that in the first embodiment, but is different therefrom in the processes performed in the control unit 11 of each of the tire-side devices 1 and in the control unit 26 of the receiver 21.

Figure 9:
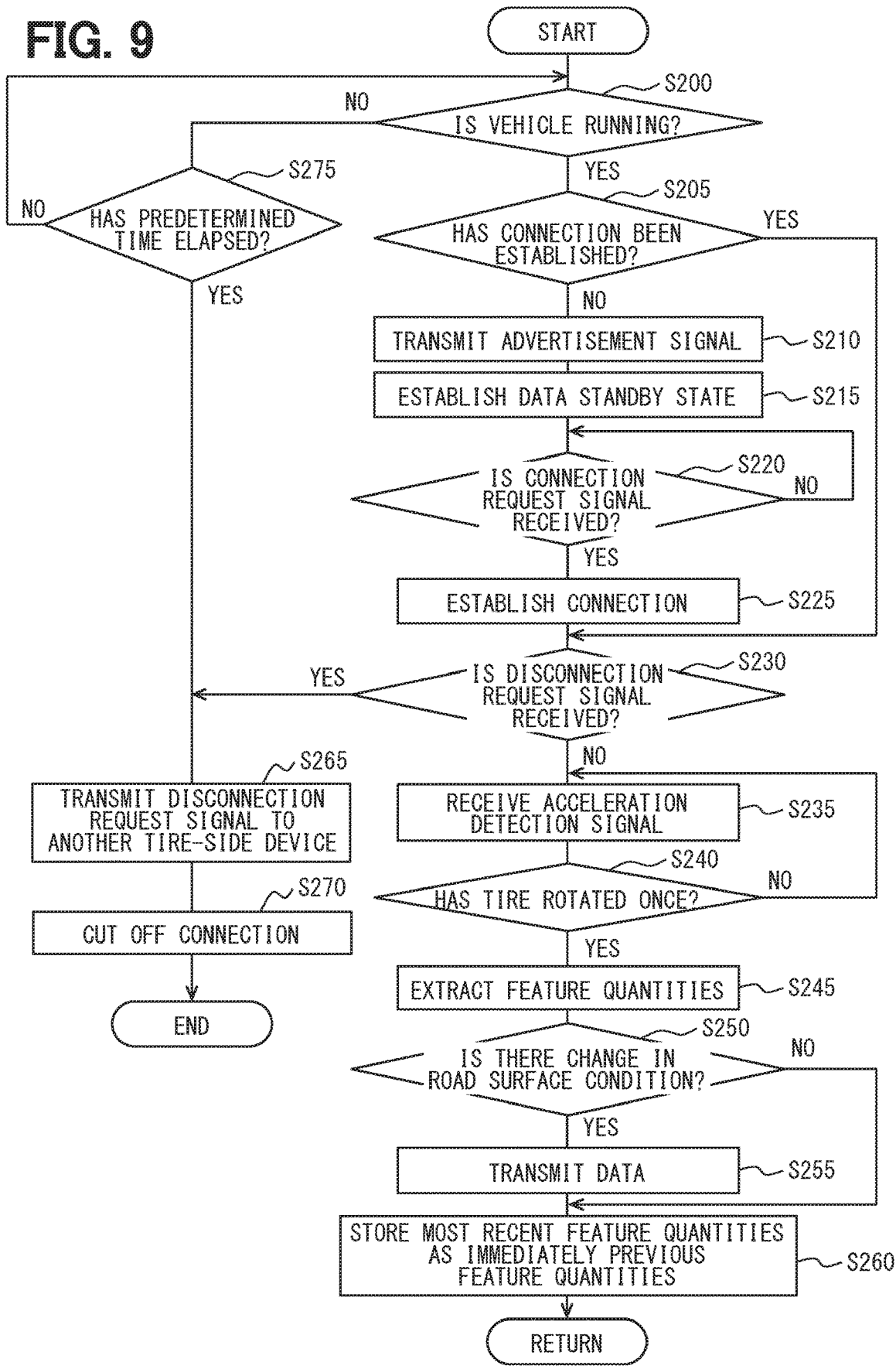
FIG. 9 is a flow chart of a tire-side process to be performed by a tire-side device provided in a tire apparatus according to a second embodiment.

Specifically, as illustrated in FIG. 9, the control unit 11 determines whether or not the vehicle is running, i.e., whether the vehicle is running or stopped in Step S200, and advances to Step S275 when determining that the vehicle is stopped. Then, in Step S275, the control unit 11 determines whether or not a predetermined time has elapsed. The predetermined time mentioned herein is set to a time longer than a stop time at a traffic light or the like, i.e., a time which is long enough to allow for the assumption that the driver ended driving. Then, during a period before the predetermined time elapses, the control unit 11 repeats the process in Step S200 to measure time. For example, the control unit 11 includes a counter which is incremented every time the control unit 11 makes a negative determination in Step S275 to determine that, when a count value in the counter reaches a predetermined value, the predetermined time has elapsed. When the control unit 11 makes an affirmative determination in Step S275, the control unit 11 resets the count value. This allows the control unit 11 to determine that the predetermined time has elapsed from the time when the car was stopped. Then, when the predetermined time has elapsed from the time when the car was stopped, the processes in Step S265 and S270 are performed.

Thus, the tire-side device 1 is allowed to sense the stopping of the vehicle and cut off the connection or bring the control unit 11 and the data communication unit 12 into the sleep state when the time long enough to allow for the assumption that the driver did not stop the vehicle at a traffic light or the like, but ended driving has elapsed. As a result, even if the disconnection request signal from the receiver 21 is not received by the tire-side device 1, the tire-side device 1 can reliably cut off the connection.

However, even in a situation in which the driver keeps the vehicle in the stopped state without turning OFF the activation switch 30 for a long time, and then resumes driving of the vehicle, the tire-side device 1 may cut off the connection. Accordingly, in the case of the second embodiment, when determining whether or not the connection has been established in step S100 in FIG. 7, the control unit 26 examines a real situation of the connection with each of the tire-side devices 1, and makes a determination based on a result of the examination. Thus, when the control unit 26 examines the real situation of the connection and determines whether or not the connection has been established in Step S100, even if the tire-side device 1 has cut off the connection, the control unit 26 makes a negative determination in Step S100. As a result, the respective processes in Steps S105 to S115 are performed to allow the connection to be established again.

Other Embodiments

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

(1) For example, in each of the embodiments described above, the case where the acceleration acquisition unit 10 forming the vibration detector is formed of the acceleration sensor is shown by way of example. However, the acceleration acquisition unit 10 can also be formed of another element capable of detecting vibration such as, e.g., a piezoelectric element.

(2) In each of the embodiments described above, as the road surface data representing the road surface condition observed in the detection signal from the acceleration acquisition unit 10 of the tire-side device 1, the data including the feature quantities is used. However, this is only exemplary, and another data may also be used as the road surface data. For example, integral value data of individual vibration waveforms in the five regions R1 to R5 included in the vibration data during one rotation of the tire 3 may also be used as the road surface data or, alternatively, raw data represented by the detection signal may also be used as the road surface data.

(3) In each of the embodiments described above, in order to reduce the power consumed by the tire-side device 1, the road surface data is transmitted when there is a change in the road surface condition. However, this is only exemplary, and the road surface data may also be transmitted with another timing. For example, the road surface data may also be transmitted every time the tire 3 rotates once or a given number of times irrespective of a change in the road surface condition or at given time intervals.

(4) The determination of a change in the road surface condition may also be made not based on the degree of similarity between the most recent feature quantities and the immediately previous feature quantities as described above, but on feature quantities (hereinafter referred to as the previous feature quantities) during previous rotations of the tire 3 including the immediately previous feature quantities.

For example, in the feature quantity storage unit 11*b*, as the feature quantities during the previous rotations of the tire 3, not only the feature quantities during the immediately previous rotation are stored, but also the feature quantities other than the feature quantities during the immediately previous rotation are stored. Specifically, in the feature quantity storage unit 11*b*, not only the immediately previous feature quantities are stored as the previous feature quantities, but also the feature quantities during the rotation a plurality of rotations before are stored as the previous feature quantities or an average value of the previous feature quantities corresponding to a plurality of rotations is stored as the previous feature quantities. For the calculation of the degree of similarity to the immediately previous feature quantities, the immediately previous feature quantities included in the previous feature quantities are used or an average value of the plurality of previous feature quantities including the immediately previous feature quantities are used. Thus, a change in the road surface condition may also be determined.

The determination of a change in the road surface condition is not limited to a case where a change in the road surface condition is determined based on the degree of similarity between the feature quantities, and a change in the road surface condition may also be determined by various other methods.

While the road surface data including the most recent feature quantities is transmitted from the tire-side device 1 when there is a change in the road surface condition, the road surface data may also include the immediately previous feature quantities. In that case, in the vehicle-body-side system 2, the immediately previous feature quantities are compared to the support vectors to allow the road surface condition before the change to be also determined. Accordingly, it is possible to determine both the road surface conditions before and after the change and more accurately recognize the change in the road surface condition.

(5) In each of the embodiments described above, the control unit 26 of the receiver 21 included in the vehicle-body-side system 2 determines the degrees of similarity of the most recent feature quantities to the support vectors and assesses the road surface condition. However, this is only exemplary, and it may also be possible that a control unit of another ECU, e.g., the brake ECU 22 determines the degrees of similarity or assesses the road surface condition or, alternatively, it may also be possible that a plurality of ECUs cooperate to perform each of the processes such as the assessment of the road surface condition. In other words, it is sufficient that any part of the vehicle-body-side system 2 can perform the same function as that of the control unit 26.

It may also be possible that the tire-side device 1 includes a support vector storage unit to be able to assess the road surface condition, while the receiver 21 receives the road surface data indicative of a result of the assessment and reads the road surface data to allow the road surface condition to be assessed.

(6) In each of the embodiments described above, when the vehicle starts to run, the tire-side device 1 transmits the advertisement signal, and the receiver 21 that has received the advertisement signal transmits the connection request signal to allow the connection of communication to be established therebetween. However, this is only exemplary, and various methods for establishing the connection of communication can also be used appropriately. For example, it may also be possible that, when the activation switch 30 is turned ON, the receiver 21 transmits the advertisement signal, and each of the tire-side devices 1 transmits the connection request signal to the receiver 21 to allow the connection to be established. However, in that case, it is required to perform scanning in each scanning cycle to allow each of the tire-side devices 1 to receive the advertisement signal. Therefore, in terms of reducing power consumption, the communication is preferably established in the manner used in each of the embodiments described.

(7) In each of the embodiments described above, it may also be possible that an external communication device capable of communicating with a communication center not shown is provided in the vehicle-body-side system 2 to transmit, together with location information during vehicle running, data indicative of a result of the assessment of the road surface condition by the control unit 26 as assessment result data to the communication center.

The communication center is a facility which manages, as a database, information on the road surface conditions at individual locations on each of the roads in map data and performs mapping of the road surface conditions which vary from moment to moment based on the received assessment result data. In other words, the communication center updates information on the road surface conditions at the individual locations on each of the roads in the map data based on the received assessment result data. Then, the communication center provides the road surface data sets from the database thereof to the vehicle. The communication center can also collect weather information or the like and correct each of the road surface data sets based on the weather information or the like to update the road surface data set to a more reliable road surface data set. By transmitting data indicative of the result of the assessment of the road surface condition to such a communication center, it is possible to obtain a more precise road surface condition and also obtain, ahead of the time, the road surface condition of a road scheduled to be traveled as well as that of the currently traveled road.

In each of the embodiments described above, the tire-side device 1 is provided in each of the plurality of tires 3. However, it is sufficient that the tire-side device 1 is provided in at least one of the plurality of tires 3.

The invention claimed is:

1. A road surface condition assessing device, comprising:
a tire-side device to be disposed in a tire of a vehicle to transmit road surface data as data related to a road surface condition; and
a vehicle-body-side system to be disposed on a body of the vehicle to receive the road surface data and assess the road surface condition, wherein
the tire-side device includes
a vibration detector that outputs a detection signal corresponding to a magnitude of vibration of the tire,
a first controller that produces the road surface data based on the detection signal, and
a first transmission/reception unit that performs data communication with the vehicle-body-side system, and the vehicle-body-side system includes
a second transmission/reception unit that performs the data communication with the tire-side device, and
a second controller that assesses the road surface condition based on the road surface data received by the second transmission/reception unit, determines an ON/OFF state of an activation switch, which brings the vehicle into a startable state, establishes a connection of communication between the first transmission/reception unit and the second transmission/reception unit in response to the activation switch being switched from the OFF state to the ON state, and causes the second transmission/reception unit to transmit a disconnection request signal requesting the tire-side device to cut off the connection of communication in response to the activation switch being switched from the ON state to the OFF state.

2. The road surface condition assessing device according to claim 1,
wherein the first controller determines whether the vehicle is running or stopped based on the detection signal and cuts off the connection of communication between the first transmission/reception unit and the second transmission/reception unit when the vehicle has been continuously stopped for a predetermined time.

3. The road surface condition assessing device according to claim 2,
wherein, when the activation switch is in the ON state, the second controller determines whether or not the connection of communication between the first transmission/reception unit and the second transmission/reception unit is maintained even after the connection of communication is established and, in response to the connection of communication being not maintained, the second controller establishes the connection of communication.

4. The road surface condition assessing device according to claim 1,
wherein the tire includes a plurality of the tires, and the tire-side device is disposed in each of the plurality of tires, and
wherein the tire-side devices disposed in the respective tires are each configured to be communicative with each other and to transmit, when receiving the disconnection request signal from the second controller, a disconnection request signal requesting to cut off the connection toward another tire-side device.

5. The road surface condition assessing device according to claim 1,
wherein the tire includes a plurality of the tires, and the tire-side device is disposed in each of the plurality of tires,
wherein, when the vehicle starts to run, the first controller transmits an advertisement signal through the first transmission/reception unit, and
wherein, when receiving the advertisement signal through the second transmission/reception unit, the second controller causes the second transmission/reception unit to transmit a connection request signal for establishing the connection to each of the tire-side devices disposed in the respective tires.

6. The road surface condition assessing device according to claim 1,
wherein the tire-side device includes an activation control unit that controls switching between an activated state and a sleep state of each of the first controller and the first transmission/reception unit, and
wherein, when the connection is cut off, the activation control unit switches each of the first controller and the first transmission/reception unit from the activated state to the sleep state.

7. The road surface condition assessing device according to claim 6,
wherein, when receiving the detection signal from the vibration detector and sensing running of the vehicle based on the detection signal, the activation control unit switches each of the first controller and the first transmission/reception unit from the sleep state to the activated state.

8. The road surface condition assessing device according to claim 1,
wherein, even after the activation switch is switched from the ON state to the OFF state, the second controller continues to operate with a continued power supply to transmit the disconnection request signal, and the power supply is stopped after the transmission of the disconnection request signal.

* * * * *